(No Model.)

C. T. HARVEY.
BICYCLE.

No. 409,964. Patented Aug. 27, 1889.

UNITED STATES PATENT OFFICE.

CHARLES T. HARVEY, OF PHILADELPHIA, PENNSYLVANIA.

BICYCLE.

SPECIFICATION forming part of Letters Patent No. 409,964, dated August 27, 1889.

Application filed June 15, 1889. Serial No. 314,438. (No model.)

*To all whom it may concern:*

Be it known that I, CHARLES T. HARVEY, a citizen of the United States, residing in the city and county of Philadelphia, State of Pennsylvania, have invented a new and useful Improvement in Bicycles, which improvement is fully set forth in the following specification and accompanying drawings.

My invention consists in providing a bicycle with a seat for a child, the same being interposed between the seat proper and steering handles or tiller, whereby the arms of the rider may encircle the child and the latter may take hold of said handle.

Figure 1:
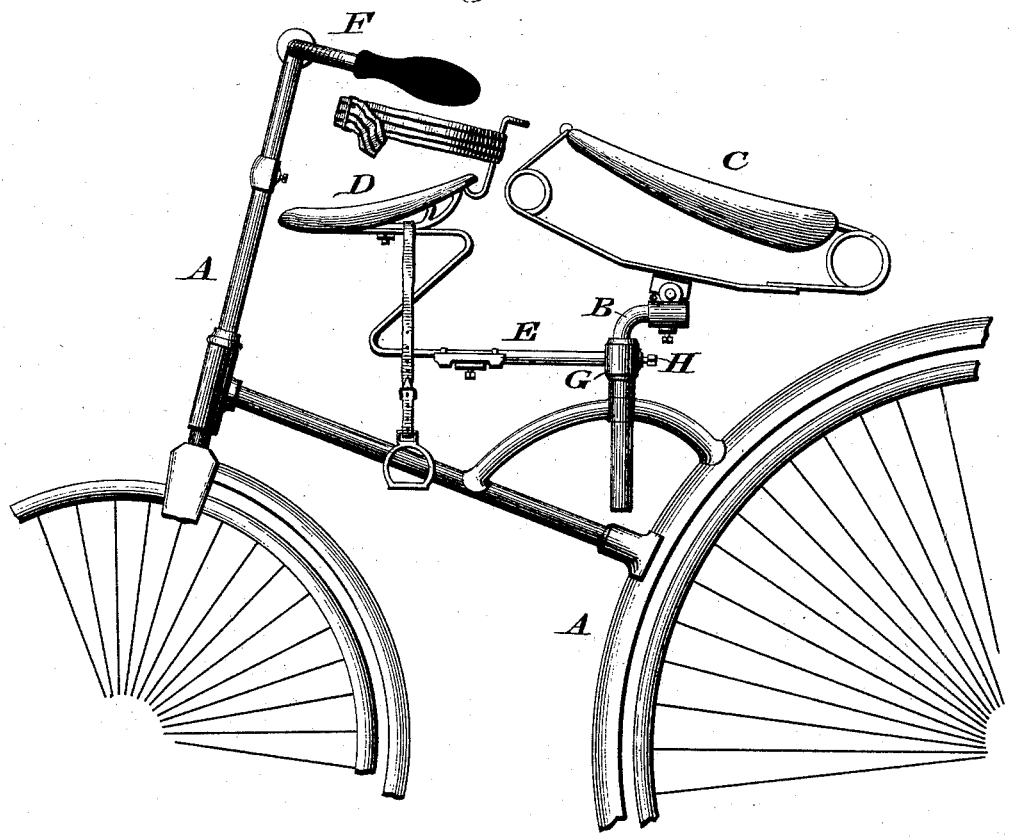
Figure 2:
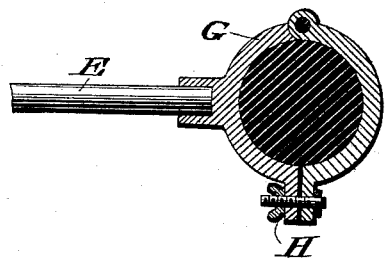

Figure 1 represents a side elevation of a bicycle embodying my invention. Fig. 2 represents a sectional view of a portion thereof on an enlarged scale.

Similar letters of reference indicate corresponding parts in the two figures.

Referring to the drawings, A designates a portion of a bicycle, which, excepting the features of my invention applied thereto, is of well-known construction.

B designates the post or standard which supports the seat C proper.

D designates a seat for a child, the same being supported on an arm E, which is connected with the standard B, it being noticed that said seat D is located between the seat C and the handles or tiller F of the steering-wheel.

It will be seen that as the bicycle is now equipped the rider may take a child with him, the latter occupying the seat D with safety, and acquiring confidence in a bicycle, as the arms of the rider on the seat C are placed around the child in reaching the handles or tiller F, which, as is evident, may also be grasped by the child, thus steadying himself. A pair of stirrups are attached to the seat D, to be used if desired. The arm E is attached to the standard by a boss G, formed with or secured to said arm and provided with a set-screw H, which tightens against the standard, thus holding the seat in position and providing for vertical adjustment of the same. When the screw is loosened, the arm may be swung around and the seat thereon located under the seat C. In order to remove said seat D, when so required, the arm E has its boss G formed as a clamp, of separate parts hinged together or otherwise jointed, and connected by a screw, so that they may be disconnected from the standard, (see Fig. 2,) this provision also admitting of the reapplication and attachment of the seat D, as is evident.

In lieu of stirrups I may use foot-rests, suitably attached to the front fork of the bicycle or other suitable part thereof. While the seats or saddles are of usual construction, the seat or saddle may have its supporting-spring attachably connected with the arm or rod E.

Having thus described my invention, what I claim as new, and desire to secure by Letters Patent, is—

1. In a bicycle, the combination, with a main seat, of a child's seat having an arm detachably secured to the standard of the main seat, said child's seat being between the main seat and the steering-handles of the bicycle, substantially as described.

2. In a bicycle, the combination of a standard having a main seat secured thereon, a boss adjustable on said standard and having an arm with a seat thereon, and steering-handles, the seat on the said arm being between said handles and main seat, substantially as and for the purpose set forth.

3. In a bicycle, the combination of a standard with a seat secured thereon, a boss consisting of hinged parts provided with a fastening-screw and adapted to be clamped on said standard, an arm attached to said boss and carrying a child's seat intermediate of the main seat and the steering-handles of the device, substantially as and for the purpose set forth.

CHARLES T. HARVEY.

Witnesses:
A. P. JENNINGS,
JAMES F. KELLY.